United States Patent Office 3,079,266
Patented Feb. 26, 1963

3,079,266
PROCESS FOR THE MANUFACTURE OF REFRACTORY MATERIALS AND RESULTANT PRODUCT
Andre Galy, Grenoble, France, assignor to Pechiney, Compagnie de Produits Chimiques et Electrometallurgiques, Paris, France, a corporation of France
No Drawing. Filed July 7, 1959, Ser. No. 825,409
Claims priority, application France July 18, 1958
7 Claims. (Cl. 106—56)

The present invention, which is the result of applicant's researches, relates to a new refractory and insulating material and, more particularly, to a process for the manufacture of carbon refractory and insulating materials.

It is already known to classify refractory materials according to their chemical composition into (a) Acid products, among which are included clay and siliceous, etc. compounds;

(b) Basic products, which include magnesia, dolomite, zirconia, etc.;

(c) Amphoteric substances, such as bauxites and corundum; and lastly (d) Neutral substances, such as carbon and chromite.

It is known, for example, to make refractories having an amorphous or graphitic carbon base by mixing clays with bituminous or tar derivatives.

It is also known that the basic characteristics of every refractory material are its porosity, pyroscopic resistance, mechanical strength, chemical corrosion, etc.

Lastly, it is known that the refractory materials play a primary role in the technology of furnaces and metallurgical apparatus.

However, to applicant's knowledge, there does not exist at present any refractory or insulating material capable of withstanding temperatures equal to or higher than 1800° C., or even 1500° C., in the presence of carbon and under a vacuum.

The present invention has for its object a refractory and, moreover, an insulating material capable of withstanding without damage temperatures higher than 1800° C. at normal pressure, or 1500° C. under a vacuum in a reducing or neutral atmosphere. The material of the present invention is constituted of pure porous carbon.

The invention also relates to a process of manufacturing such a product and its applications.

The other objects of the invention will be disclosed in the course of the following description.

Applicant has discovered a new product possessing, in addition to outstanding pyroscopic and chemical resistance, the following remarkable characteristics: low density, below 0.4 and close to 0.25; low thermal conductivity, of the order of a few tenths of a kilocalory per square meter of surface, per meter thickness, per degree and per hour and, more particularly, a thermal conductivity between 0.3 and 0.5 kcal./m.$^2$/m./degrees/h.; good mechanical strength, i.e. crushing strength greater than 10 kg./cm.$^2$; and, finally, easy workability and application, as it can be machined by simple tools suitable for wood and converted to any desired shape.

Applicant's researches have established that the said product can be obtained by heating to high temperatures, above 400° C., and preferably of the order of 1200° C. and higher, a mixture of solid compounds having a carbohydrate base, such as oses, holosides, heterosides, cellulose, etc., and liquid compounds capable of forming gels and having a carbohydrate base, such as oses, holosides, heterosides, polyosides such as cellulose, starch, vegetable gums (gum of wood, gum arabic, gum of cherry wood) etc. and/or proteins, such as gelatins, glues.

Applicant has also developed a process for the manufacture of refractory and insulating elements according to the invention; while this process, which is described below, is the preferred procedure, it is not given by way of limitation but only by way of example.

By mixing at a high temperature of the order of 100° C., there is prepared a fine water suspension of a compound capable of forming a gel such as, and without limitation, starch, molasses, fecula (potato starch), bone glue, etc., or of mixtures of such compounds. To this suspension, there is added an amount of porous solid compounds such as, and without limitation, cellulose derivatives, for example, wood chips, straw, cellulose sponge, etc., flours, edible pastes, etc. There is obtained in this way, a pasty mixture which is very viscous at the mixing temperature and which tends to solidify on cooling to room temperature.

The mixture, constituted of a porous solid skeleton thoroughly (perfectly) impregnated with the gel-forming binder, is then placed into molds corresponding to the shape of the desired refractory materials, for example, into fire clay vessels or shells, cardboard, wood, or metal molds, etc. It is then submitted to a slight pressure of the order of a few hundred grams per cm.$^2$ in order to insure the uniform gluing of the entire mass without, however, excessive increase of the bulk density.

The temperature of the mixture is then slowly and progressively raised to 400° C. and higher, preferably in the neighborhood of 1200° C. Such heating can be accomplished by any known means, for example, in a rotating fire furnace, a tunnel-furnace, etc.; according to the invention, it is carried out in a neutral or reducing atmosphere. Following a preferred embodiment of the invention, the temperature is raised a few tens degrees per hour and, more particularly, about 20 degrees per hour.

The constituents of the mixture are then totally coked and the refractory and insulating elements obtained in this manner are progressively cooled.

However, if the maximum heating temperature has been only of the order of 1200° C. then, there still remains in the elements, besides carbon, a small quantity—of the order of a few percent—of alkaline ashes originating from the starting products. In order to remove these ashes completely, it is necessary to raise the temperature of the elements above 1200° C. and preferably, in the neighborhood of 1700° to 1800° C.

According to a preferred embodiment of the invention, the elements are allowed to cool progressively and slowly from about 1200° C.—which is the temperature attained in the course of first heating—to a temperature below 400 or 300° C.; they are then again heated, under vacuum, to a temperature of the order of 1700°–1800° C. This second treatment has for its purpose first, to remove the ashes and, second, to increase the mechanical strength of the elements.

The following examples, which are in no way given by way of limitation, will illustrate the process for obtaining the refractory and insulating material of the present invention.

Example 1

In a mixer provided with a heating device and fitted with temperature controls, there are introduced 200 liters (of the order of 250 kg.) beet sugar molasses containing about 50% water. Mixing is effected for one half hour at 120° C.; the evaporated water amounts to about 50% of the initial water content.

There is then introduced 75 kg. chips, for example, of a resinous wood, produced by a planer and which have been preliminarily screened on 5 to 20 mm. sieves in order to retain only chips of a size between these two dimensions. The mixture of chips and molasses is stirred in the same manner for one half hour at 120° C.

There is then obtained a very viscous paste which becomes almost solid if it be again allowed to attain room temperature.

This paste is poured into fire clay shells (pipes) of about 6 liters capacity and is slightly tamped with a pressure of about 200 g./cm.$^2$.

About 50 shells (pipes) are filled in this manner and are then piled up in the trucks of a tunnel-furnace of the ceramic-furnace type. Protection against the heating gases is secured by means of a layer of powdered coke or silica sand placed on the upper part.

The temperature is raised about 20 degrees per hour until it reaches 1100° to 1200° C.; cooling is then carried out at the same slow rate until a temperature of 300° C. or below is reached.

The bricks obtained in this way are then submitted to a second treatment at a high vacuum, at a temperature in the neighborhood of 1800° C. These bricks, which possess a volume of the order of 150 liters after the first heating, lose during this second heat treatment 5 to 8% of their weight without any substantial change in volume.

The bricks finally produced possess the following characteristics:

Thermal conductivity ___ About 0.5 kcal./m.$^2$/m./° C./h.
Specific gravity _____ About 0.25.
Compressive strength ___ About 10 to 12 kg./cm.$^2$.
Ashes _____ <0.2%.

These bricks are easily cut and shaped with the usual tools for wood. They can be used as refractory and insulating materials in the construction of industrial furnaces, and/or any metallurgical equipment or the like, which require the use of refractory or insulating products capable of withstanding temperatures higher than 1800° C. at normal pressure in a neutral or reducing atmosphere, for example, in the presence of carbon; moreover, they are quite adapted for work under a high vacuum and at temperatures higher than 1500° C.

*Example 2*

A manioc meal slurry is prepared by boiling a suspension of 10 kg. meal in 100 liters water. This slurry is introduced into a mixer in which there is also added 100 kg. (that is, about 250 liters) edible pastes of the commercial type, in the form of grooved cylinders having roughly, the following dimensions: a diameter of 12–15 mm., a length of 50 mm.

The mixture is stirred for about 20 to 30 minutes at a temperature of the order of 40° to 60° C.

The resultant paste is then poured into sheet iron molds having the following dimensions: 33 x 17 x 9 cm. The paste is slightly tamped therein under a pressure of about 100 to 200 g./cm.$^2$. The molds containing the paste are introduced into an electrically heated tunnel-furnace, the temperature of its hottest section being controlled to 400° C. By the use of a mechanical conveyor belt, the molds advance in the furnace at a rate corresponding to a rise in temperature of 20 to 25 degrees C. per hour. The temperature of 400° C. is high enough to insure the coking of the mixture, and is low enough to permit sweeping of the furnace by a current of air which assists in the removal of water and hydrocarbon vapors, liberated from the bricks, without inducing combustion.

After cooling at the same rate as they were heated, the bricks almost attain their final shape. Their volume has been reduced about 50%. The dimensions are those of standard bricks, 22 x 11 x 6 cm.

Nevertheless, these bricks have still retained some heavy tars and the total amount of alkaline ashes contained in the initial products.

They are then submitted to a second treatment which raises their temperature to 1800° C. under a high vacuum. During this treatment, they are converted to pure coke, deprived of ashes, and lose 4% to 5% of their weight.

The characteristics of the refractory and insulating bricks obtained in this manner are substantially identical with those of the bricks obtained according to Example 1.

Among the non-oxidizing, i.e. reducing or neutral, atmospheres which can be used for carrying out the first heat treatment according to the present invention, are for instance neutral atmospheres such as rare gas: argon, helium or nitrogen or reducing atmospheres such as: carbon monoxide, hydrogen, or methane, natural gas, cracking gas, ammoniac.

The second heat treatment—to remove ashes and heavy tars—is carried out in a vacuum which may vary between 1 micron and 10 millimeters of mercury.

The term "holosides" as used in the present specification refer for instance to saccharose, lactose, maltose.

The term "heterosides" refer to natural extracts such as: tanin, salicin, amygdalin.

The term "oses" refer to natural sugars such as: glucose, mannose, galactose, fructose.

I claim:

1. Process for making refractory heat insulating product consisting substantially of carbon comprising the steps of: intimately mixing, at a temperature of about 100° C., particles of a porous solid substance consisting substantially of a compound selected from the group consisting of oses, holosides, heterosides, and polyosides, with a liquid binder capable of forming a gel consisting substantially of an aqueous suspension of a material selected from the group consisting of oses, holosides, heterosides, polyosides, gelatine, and glues, to form a pasty mixture at the mixing temperature of a porous solid skeleton thoroughly impregnated with the gel-forming binder; placing this pasty mixture into molds corresponding to the shape of the desired refractory product; submitting this paste to a slight pressure of about 100–200 grams/cm.$^2$ to thereby insure the uniform filling of the entire mold without substantially increasing the bulk density of the mass; heating the mixture progressively in a non-oxidizing atmosphere up to a temperature of about 1200° C. whereby the pasty mixture is coked and transformed into carbon.

2. A process according to claim 1, wherein said product is subsequently progressively heated in a vacuum to a temperature range between about 1200° C. and about 1800° C.

3. A process according to claim 1, wherein the heating is carried out progressively so as to raise the temperature of the paste at the rate of about 20° C. per hour.

4. A process according to claim 1, wherein the product is cooled to about 300° C. and subsequently progressively heated to a temperature up to 1800° C.

5. A process according to claim 1, wherein the product is progressively cooled to about 300° C. at the rate of about 20° C. per hour, and subsequently progressively heated to a temperature up to 1800° C.

6. A refractory heat insulating product produced by the process of claim 1.

7. A refractory heat insulating product produced by the process of claim 2.

References Cited in the file of this patent

UNITED STATES PATENTS

| | | |
|---|---|---|
| 1,395,866 | Pearce | Nov. 1, 1921 |
| 1,501,108 | Hamister | July 15, 1924 |
| 1,538,505 | Atkinson | May 19, 1925 |
| 1,873,410 | Harak | Aug. 23, 1932 |